United States Patent [19]
Kawano et al.

[11] Patent Number: 5,824,435
[45] Date of Patent: Oct. 20, 1998

[54] NON-SINTERED TYPE NICKEL ELECTRODE

[75] Inventors: Hiroshi Kawano, Ibaraki; Takayuki Hayashi, Moriguchi; Isao Matsumoto, Osaka, all of Japan

[73] Assignee: Matsushita Electric Industrial Co., Ltd., Osaka, Japan

[21] Appl. No.: 603,339

[22] Filed: Feb. 20, 1996

[30] Foreign Application Priority Data

Jun. 22, 1995 [JP] Japan .................................. 7-155912

[51] Int. Cl.$^6$ ...................................................... H01M 4/64
[52] U.S. Cl. ............................................. 429/223; 429/241
[58] Field of Search ........................................ 429/223, 241

[56] References Cited

U.S. PATENT DOCUMENTS

| | | | |
|---|---|---|---|
| 2,251,913 | 8/1941 | Brennan | 429/223 |
| 3,759,746 | 9/1973 | McCallum | 429/223 X |
| 5,200,281 | 4/1993 | Leap et al. | |
| 5,200,282 | 4/1993 | Ohnishi et al. | 429/223 |
| 5,487,961 | 1/1996 | Strangways et al. | 429/223 |
| 5,543,250 | 8/1996 | Yanagihara et al. | |

FOREIGN PATENT DOCUMENTS

| | | |
|---|---|---|
| 0651451A | 5/1995 | European Pat. Off. . |
| 43-5622 | 3/1968 | Japan . |
| 52-118532A | 10/1977 | Japan . |
| 56-003976 | 1/1981 | Japan . |

*Primary Examiner*—John S. Maples
*Attorney, Agent, or Firm*—Stevens, Davis, Miller & Mosher, L.L.P.

[57] ABSTRACT

A non-sintered type nickel electrode comprising an electrode substrate coated at its opposite surfaces with an active material for a cell; the electrode substrate comprising a metal member in the form of one of a metal plate and a metal foil, the metal member being worked into a corrugated shape, and an apparent thickness of the corrugated metal member being not less than three times larger than the thickness of the metal member before the working; and a microscopically-irregular layer being formed on each of opposite surfaces of said metal member generally over an entire area thereof, the microscopically-irregular layer being composed of one of nickel, cobalt and a mixture thereof.

2 Claims, 1 Drawing Sheet

NON-SINTERED TYPE NICKEL ELECTRODE

BACKGROUND OF THE INVENTION

This invention relates to a non-sintered type positive nickel electrode used in an alkaline storage cell, in which an electrode substrate and a cell active material are firmly bonded together to thereby enhance high-efficiency discharge characteristics and cycle life characteristics.

A typical example of a positive electrode for an alkaline storage cell is an oxidized nickel electrode. Such oxidized nickel electrodes are broadly classified into a sintered type and a non-sintered type. In the former type, a micro-porous, sintered substrate, formed by sintering nickel powder, is immersed, for example, in an aqueous solution of nickel nitrate, and then the sintered substrate is dried. Thereafter, the sintered substrate is immersed in an aqueous solution of caustic alkali so as to transform it into nickel hydroxide, thereby forming an electrode plate. This method has drawbacks that its process is complicated, and that the density of loading of nickel hydroxide (active material) is lower as compared with a non-sintered type electrode described later. However, this method has a feature that the electrode is excellent in high-efficiency discharge characteristics and cycle life, and therefore this method has been extensively used in some applications. On the other hand, for producing the non-sintered type electrode, there has been used a method in which powder of nickel hydroxide (active material) is loaded or charged directly into a porous, foamed nickel member. This method has features that the electrode-producing process can be simplified, and that since the foamed nickel member of high porosity can be obtained, the high-density loading can be achieved, and therefore the cell with a high capacity can be produced. However, this method has a drawback that the cost is high since the porous, foamed nickel member is formed by electroplating. Therefore, there have been developed non-sintered type electrodes in which an electrode substrate is made of an inexpensive material, such as a punched metal plate and an expanded meal plate, instead of a porous, foamed nickel member. These electrode substrates do not have a three-dimensional construction as in the porous, foamed nickel member, and therefore these electrode substrates, when used as an electrode, exhibits a low force to retain the active material thereon, and when the charging and discharging are repeated during the production of the electrode, the active material is liable to be removed from the electrode substrate. Furthermore, these electrode substrates exhibit poor electron conductivity in the direction of the thickness of the electrode, so that electrode characteristics are much lowered.

The method of producing the electrode while using a punched metal plate, an expanded metal plate or the like as the electrode substrate has an advantage that the electrode can be produced easily by forming powder of the active material into a paste by the use of a polymeric binder solution and electrically-conductive powder, then by coating this paste on the electrode substrate, and then by drying the coated paste. However, the force of bonding between the electrode substrate and the active material layer is low, and when this electrode is used in a cell, the active material layer is liable to be separated from the electrode substrate. As a result, in the case where the electrode substrate serves also as a collector, electric resistance of the electrode increases, so that a discharge voltage as well as a discharge capacity is lowered. To overcome this problem, if a large amount of a binder is applied into the active material layer, the separation phenomenon can be suppressed; however, this adversely affects the reactivity of the active material and the discharge characteristics.

In order to increase the force of bonding between the electrode substrate and the active material layer, there can be used a method in which a layer of a thermoplastic, polymeric resin serving as an adhesive is formed on the surface of the electrode substrate, and then the active material is formed in an upper layer portion thereof, and then heat is applied, thereby improving the bonding between the electrode substrate and the active material layer. However, the insulating layer is formed on the electrode substrate and the active material layer, so that the collecting properties of the electrode is lowered, thus adversely affecting the reactivity of the electrode.

To overcome these problems, there have been proposed a method, in which burrs are intentionally formed when perforating a metal plate, and a method in which a metal plate is formed or shaped into a corrugated configuration, and burrs are formed, thereby providing a three-dimensional construction. With such a method, electron conductivity in a direction of the thickness is improved; however, since the surface of the electrode substrate is flat and smooth, it has been difficult to satisfactorily preventing the electrode active material layer from being separated from the electrode substrate.

SUMMARY OF THE INVENTION

This invention has been made in order to overcome the above problems, and an object of the invention is provide a cell in which an active material is prevented from being separated from an electrode substrate, thereby prolonging a lifetime of the cell.

In a non-sintered type nickel electrode of the present invention, an electrode substrate comprises a metal plate or a metal foil which is worked or formed into a corrugated shape, and an apparent thickness thereof after the working is not less than three times larger than the metal plate or the metal foil before the working. A microscopically-irregular layer is formed on each of opposite surfaces of the electrode substrate, the microscopically-irregular layer being composed of one of nickel, cobalt and a mixture thereof.

Additionally, the corrugated metal plate or foil has alternate ridge portions and groove portions, as shown in FIGS. 2A, 2B, and 3, whereby openings are formed through one or both of the ridge portions and groove portions.

In the non-sintered type nickel electrode of the invention, the electrode substrate is formed into a corrugated shape, and the microscopically-irregular layer is formed on each of opposite surfaces thereof. With this construction, the force of bonding between the substrate and an active material is increased. As a result, even when the charging and discharging are repeated over a long period of time, the active material is hardly separated from the electrode substrate, thereby prolonging a lifetime of the cell.

DESCRIPTION OF PREFERRED EMBODIMENTS

A preferred embodiment of the invention will now be described with reference to the drawings.

Figure 1:
FIG. 1 is a cross-sectional view of a corrugated metal plate.

Corrugated metal plates as shown in FIG. 1 were prepared while using a strip-like nickel plate having a thickness of 60 $\mu$m. These corrugated metal plates were formed into four kinds of nickel plates a, b, c and d having respective apparent thicknesses of 150 $\mu$m, 180 $\mu$m, 300 $\mu$m and 600 $\mu$m from a ridge portion to a groove portion of the corrugation.

Figure 2A:
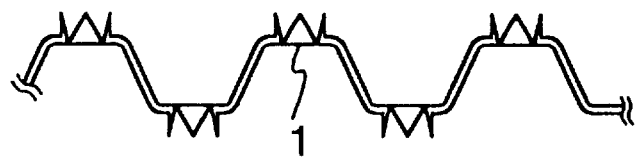
FIG. 2A is a cross-sectional view of a porous metal member of the invention having slitted portions projected outwardly of the plate from the inner side.
Figure 2B:
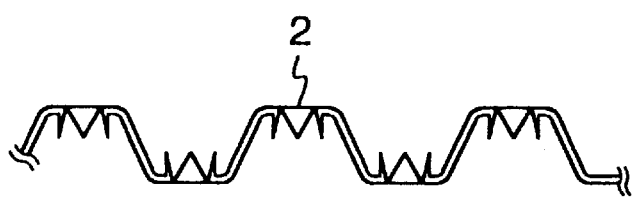
FIG. 2B is a cross-sectional view of a porous metal member of the invention having slitted portions projected inwardly of the plate from the outer side.

A corrugated nickel plate b-1, having the same thickness as the nickel plate b, was also prepared while using a punched metal plate obtained by forming perforations in the above-mentioned strip-like nickel plate. The diameter of the perforations was 1.5 mm, and the pitch (that is, the distance between the centers of the adjacent perforations) was 3 mm. The ridge portions and groove portions of each of the nickel plates a to d were flattened, and cross-shaped slits 1 and 3 in FIGS. 2A and 3 respectively were formed through each of these flattened portions, and each of these slitted portions was bent or projected outwardly of the plate from the inner side into a three-dimensional configuration. In this manner, porous nickel members a-2 to d-2 were prepared respectively from the nickel plates a to d. Similarly, porous nickel members a-3 to d-3, having their respective slitted portions 2 as shown in FIG. 2B bent or projected inwardly of the plate form the outer side, were prepared respectively from the nickel plates a to d. FIG. 2A is a cross-sectional view of the porous nickel member a-2, and FIG. 2B is a cross-sectional view of the porous nickel member a-3.

A mixture of nickel powder and an aqueous solution of polyvinyl alcohol was sprayed to the surfaces of each of the above nickel plates and porous nickel members, and then the mixture was dried to fix the nickel powder.

Then, each of these was heated to a temperature of 800° in a nitrogen stream containing 50% hydrogen, thereby firmly bonding the nickel powder and the nickel plate together by sintering. According to the same procedure, other samples were prepared using cobalt power and a mixture of 50% nickel powder and 50% cobalt powder instead of nickel powder. Preparation conditions for the above nickel plates and porous nickel members are shown in Table 1 below.

TABLE 1

| SAMPLE | APPARENT THICKNESS AFTER WORKING ($\mu$m) | BENDING DIRECTION | MICROSCOPICALLY-IRREGULAR LAYER | MATERIAL OF MICROSCOPICALLY-IRREGULAR LAYER |
|---|---|---|---|---|
| a | 150 | — | NONE | — |
| b | 180 | — | " | — |
| c | 300 | — | " | — |
| d | 600 | — | " | — |
| a' | 150 | — | PROVIDED | NICKEL |
| b' | 180 | — | " | " |
| c' | 300 | — | " | " |
| d' | 600 | — | " | " |
| b-1 | 180 | — | " | " |
| a-2 | 150 | OUTWARD | " | " |
| b-2 | 180 | " | " | " |
| c-2 | 300 | " | " | " |
| d-2 | 600 | " | " | " |
| a-3 | 150 | INWARD | " | " |
| b-3 | 180 | " | " | " |
| c-3 | 300 | " | " | " |
| d-3 | 600 | " | " | " |

Electrodes were prepared using these samples as an electrode substrate, respectively, in the following manner.

Based on 100 g of nickel hydroxide powder, 5 g of graphite powder, 10 g of cobalt powder, 55 g of a 3 wt. % aqueous solution of carboxymethyl cellulose (CMC) and 5 g of a 48 wt. % dispersion of styrene-butadiene rubber (SBR) were kneaded to form a paste. This paste was coated on opposite sides (faces) of each of the electrode substrates shown in Table 1, and each electrode substrate coated with this paste was passed through a slit in a stainless steel member, thereby adjusting the paste-coated electrode substrate to a predetermined thickness, and then each electrode substrate was dried and pressed, and then was cut into a predetermined size, thereby providing a positive nickel electrode.

Figure 3:
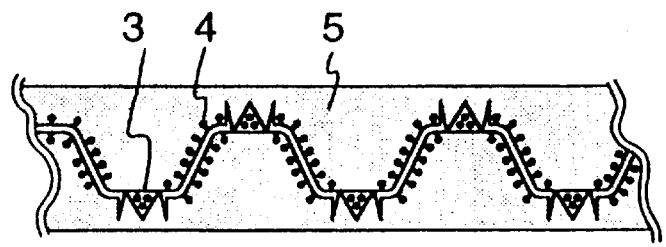
FIG. 3 is cross-sectional view of a positive electrode of the invention.

FIG. 3 is a cross-sectional view of the positive electrode comprising the porous nickel member d-2.

Then, each of these positive nickel electrodes, a known negative cadmium electrode, and a nonwoven fabric of a polyamide resin were combined together to form a single 3-type cell with a nominal capacity of 800 mAh. As an electrolyte, 1.8 ml of 30 wt. % aqueous solution of potassium hydroxide (having lithium hydroxide dissolved in an amount of 30 g/l) per ell was used. In this manner, cells A to D, A' to D', B-1, A-2 to D-2 and A-3 to D-3 were prepared respectively using the positive nickel electrodes obtained respectively from the electrode substrates a to d, a' to d', b-1, a-2 to d-2 and a-3 to d-3 shown in Table 1.

Each of the cells prepared under the above conditions was charged at 0.1 C for 15 hours, and the charging was stopped for one hour, and then was discharged at 0.2 C until the voltage of the cell reached 1.0 V. Under these conditions, three cycles of this operation were effected in a repeated manner. Under the same charging conditions, the discharge at a 4th cycle was effected at 0.5 C, and the discharge at a 5th cycle was effected at 1 C, and a comparison of discharge characteristics was made. From a 6th cycle on, the charge was effected at 0.3 C for 4 hours, and the discharge was effected until the voltage of the cell reached 0.5 C, thus conducting a cycle life test. Results of these tests are shown in Table 2.

achieved by the increased bonding between the electrode active material layer 5 (composed mainly of nickel hydroxide) and the electrode substrate 3, and this is the advantageous effect of the present invention. On the other hand, in the cells A and A', the electrode active material utilization factor and the high-efficiency discharge characteristics were much reduced. From this, it is thought that the electron conductivity was poor in the direction of the thickness when the electrode was produced since the apparent thickness after the working of the nickel plate into a corrugated shape was small. Therefore, it is preferred that the apparent thickness after the working should be not less than three times larger than the thickness before the working.

The cell B-1 having the electrode substrate formed by the punched metal plate, the cells B-2 to D2 (in which the slitted portions 1 in the plate were projected outwardly of the plate

TABLE 2

| CELL | THEORETICAL CAPACITY OF POSITIVE ELECTRODE (mAh) | UTILIZATION FACTOR AT 3RD CYCLE (%) | CAPACITY RATIO OF 3RD CYCLE TO 5TH CYCLE (%) | DISCHARGE CAPACITY AT 100TH CYCLE (mAh) | DISCHARGE CAPACITY AT 200 CYCLE (mAh) |
|---|---|---|---|---|---|
| A | 895 | 80.5 | 68.1 | 493 | 120 |
| B | 905 | 93.0 | 82.2 | 587 | 228 |
| C | 920 | 94.2 | 86.1 | 651 | 315 |
| D | 922 | 95.1 | 88.0 | 742 | 431 |
| A' | 898 | 81.2 | 69.3 | 678 | 597 |
| B' | 903 | 93.5 | 83.6 | 808 | 783 |
| C' | 915 | 94.7 | 87.2 | 841 | 822 |
| D' | 919 | 95.7 | 89.9 | 858 | 840 |
| B-1 | 935 | 94.0 | 85.8 | 848 | 821 |
| A-2 | 902 | 81.7 | 73.1 | 707 | 602 |
| B-2 | 908 | 94.0 | 84.5 | 825 | 800 |
| C-2 | 921 | 95.2 | 88.2 | 848 | 827 |
| D-2 | 933 | 96.3 | 91.4 | 868 | 850 |
| A-3 | 900 | 82.2 | 73.8 | 703 | 589 |
| B-3 | 904 | 94.1 | 84.1 | 820 | 792 |
| C-3 | 912 | 95.7 | 88.0 | 845 | 820 |
| D-3 | 927 | 96.2 | 91.0 | 861 | 847 |

From these test results, the following will be appreciated. First, with respect to the cells A to D each having the electrode substrate formed merely by shaping the nickel plate into a corrugated configuration, the greater the apparent thickness was, the better the utilization factor of the nickel electrode, the high-efficiency characteristics and the cycle life were. And besides, even with respect to the cell D having the longest lifetime, the discharge capacity was reduced to less than 50% at a 200th cycle. Therefore, it is difficult to obtain the long-life cell merely with the corrugated configuration.

With respect to the cells A' to D' each having the positive electrode comprising the electrode substrate (a' to d') having the nickel powder fixedly secured to the nickel plate surface by sintering, all of these cells except the cell A' exhibited more than 90% active material utilization factor at an initial stage, and were subjected to a small reduction in discharge capacity even after 200 cycles of discharge-charge operation, thus exhibiting good characteristics. This shows that the cells B' to D' each including the electrode substrate having a microscopically-irregular layer 4 (see FIG. 3) formed on each surface (side) of the nickel plate have a longer lifetime than the cells B to D each including the electrode substrate having no such microscopically-irregular layer 4. This advantageous effect of the cells B' to D' is from the inner side into a three-dimensional shape as shown in FIG. 2A) and the cells B-3 to D-3 (in which the slitted portions 2 in the plate were projected inwardly of the plate from the outer side into a three-dimensional shape as shown in FIG. 2B) exhibited good cell characteristics.

However, the cells A-2 and A-3, having the respective electrode substrates 3 formed respectively by the porous nickel members a-2 and a-3, exhibited cell characteristics similar to those of the cell A'. It is thought that this was caused by adverse effects due to the small apparent thickness after the working of the plate into a corrugated shape. In this embodiment, although the cell characteristics, obtained with the use of the nickel power for forming the microscopically-irregular layers 4, have been described, similar characteristics were obtained using cobalt powder or a mixture of nickel powder and cobalt powder instead of nickel powder, and thus in this case, also, the advantageous effects of the present invention were obtained. Incidentally, when the cobalt powder was used, the decrease of the discharge capacity caused by charging and discharging was less. This shows that the advantageous effects of the present invention are enhanced by the use of the cobalt powder although cobalt is expensive. It is thought that the reason for this is that part of cobalt melts and precipitates by charging and discharging, thereby forming an electrically-conductive network.

The advantageous effects of the present invention have also been achieved using short fibers of nickel or cobalt instead of powered nickel and cobalt, and thus any suitable material can be used in so far as the microscopically-irregular layers 4 can be formed. In this embodiment, although the nickel plate is used as the metal plate, the advantageous effects of the present invention were achieved even when an inexpensive iron plate plated with nickel was used as the metal plate. Thus, any suitable material can be used in so far as its surface is alkaliproof.

As described above, in the present invention, the metal plate or the metal foil is formed or worked into a corrugated shape in such a manner that the apparent thickness thereof is not less than three times larger than the thickness before the working. Then, the microscopically-irregular layer 4, composed of one of nickel, cobalt and a mixture thereof, is formed on each of the opposite surfaces of the metal plate or the metal foil, thereby providing the electrode substrate 3. With this construction, the cell having a long lifetime can be provided, and this electrode substrate 3 can be produced at a lower cost as compared with the conventional sintered substrate and foamed nickel substrate.

What is claimed is:

1. A nickel electrode for a cell, comprising:

an electrode substrate coated at its opposite surfaces with an active material for the cell, said electrode substrate comprising a metal member in the form of one of a metal plate and a metal foil, said metal member being worked into a corrugated shape and having a thickness defined by a distance from a crest of said corrugated metal member to a bottom thereof, said thickness after the working being not less than three times the thickness of said metal member before said working, at least one of said crest and said bottom being provided with openings defined by three-dimensional projections extended from said metal member toward an interior of a space defined by said distance from said crest to said bottom; and a microscopically-irregular layer formed on most of each of the opposite surfaces of said metal member.

2. A nickel electrode for a cell according to claim 1, wherein said microscopically-irregular layer is made of one of nickel, cobalt and a mixture of nickel and cobalt.

\* \* \* \* \*